United States Patent Office 2,960,440
Patented Nov. 15, 1960

2,960,440

ANTI-INFLAMMATORY AND ANALGESIC COMPOSITION

Max Jacobson, 225 E. 73rd St., New York 21, N.Y., and Alexander J. Kelemen, 35—54 169th St., Flushing, N.Y.

No Drawing. Filed July 26, 1957, Ser. No. 674,273

8 Claims. (Cl. 167—65)

This invention relates to a novel composition useful as an anti-inflammatory and analgesic agent. More specifically, this invention relates to a product brought about by admixing a known analgesic compound and a compound added thereto that alleviates or removes the deleterious side-effects of the known analgesic when said analgesic is administered alone.

Arthritis or inflammation of the joints is a disease that has for many years plagued members of the human race. Recently, however, great advances in the arresting of the pain and swelling characteristics of this disease have been made. These advances are represented by a number of chemico-therapeutic agents.

Among the chemical agents found so useful are a group of compounds derived from 3:5 dioxo-pyrazolidine, corresponding to the general formula

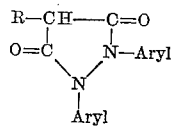

or to its tautomeric forms, as well as their non-toxic salts with inorganic and organic bases. These pyrazolidines are further described and their preparations and utility fully set forth in U.S. Pat. No. 2,562,830, issued July 31, 1951. The disclosure of said patent is made a part of this specification.

Hereinafter, for ease of expression, the pyrazolidine compounds of Pat. No. 2,562,830, described as having therapeutic activity shall be referred to as pyrazolidines.

While the pyrazolidines set forth in Pat. No. 2,562,830, have shown remarkable results in the treatment of arthritis, their general acceptance has been limited due to undesirable side-effects. For example, 1:2-di-phenyl-4-n,butyl-3:5 dioxo-pyrazolidine (butapyrazolidine), when administered by injection, results in substantial pain and inflammation at the site of injection. Further, in several cases, there has been noted the occurrence of agranulocytosis, i.e. lowering of the white cell count in the blood. On occasion when butapyrazolidine was given intramuscularly, there has resulted a sterile abscess or sloughing of tissue. Finally, clotting of the blood has been noted at the point of injection when given intravenously. See New and Non-official Remedies, 1955, pp. 20–21, for a more complete discussion of the side-reactions accompanying the giving of butapyrazolidine.

An attempt to remove the pain and concomitant inflammation accompanying injection was made by compounding the butapyrazolidine with a local anesthetic, such as procaine or xylocaine. While a small measure of temporary relief of pain was attained, the pain accompanying injection was still of a high order, and of course, the local anesthetic did not remove or overcome the other side-reactions previously mentioned.

An object of this invention is to provide a product which will not result in the undesirable side-effects accompanying the intra-muscular or intravenous injection of the pyrazolidines when administered alone.

A further object is to provide a product having therapeutic activity as an anti-inflammatory and analgesic agent.

A still further object is to provide a product having therapeutic activity as an anti-inflammatory and analgesic agent which does not bring about additional undesirable side-reactions, other than those attributed to pyrazolidines, per se.

Generally stated, this invention is the discovery that a product resulting from the admixing of a pyrazolidine and a member of the barbituric acid group or non-toxic salts thereof, having anti-inflammatory and analgesic properties, yet not having the undesirable side-effects accompanying the injection of pyrazolidine alone, may be obtained.

As is well known, barbituric acid may be prepared by the reaction of ethyl malonate and urea in the presence of sodium ethylate. By substituting on the middle carbon of the malonic acid, a number of derivatives of barbituric acid may be prepared. The general reaction is illustrated below.

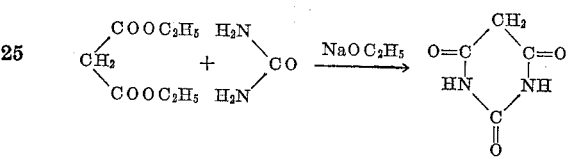

Following are listed derivatives of barbituric acid obtained by substituting for the two hydrogens on the number 5 carbon of barbituric acid.

5-allyl-5-isobutyl-2,4,6-trioxy-pyrimidine (Sandoptal), 5-allyl-5-isopropyl-2,4,6-trioxy-pyrimidine (Allonal), 5-butyl-5-ethyl-2,4,6-trioxy-pyrimidine (Neonal), 5,5-diallyl-2,4,6-trioxy-pyrimidine (Dial), 5,5-dibromo-2,4,6-trioxy-pyrimidine (Dibromin), 5,5-diethyl-2,4,6-trioxy-pyrimidine (Barbital), 5,5-dipropyl-2,4,6-trioxy-pyrimidine (Propanal), 5-ethyl-5-isoamyl - 2,4,6 - trioxy - pyrimidine (Amytal), 5-ethyl-5-phenyl-2,4,6-trioxy-pyrimidine (Luminal), 5 - hydroxy - 2,4,6 - trioxy - pyrimidine(Dialuric Acid), 5 - isonitroso - 2,4,6 - trioxy - pyrimidine (Violuric Acid), 5,5-sulfamido-2,4,6-trioxy-pyrimidine (Thionuric Acid), 5-ethyl-5(1-methylbutyl)-2,4,6-trioxy - pyrimidine (Nembutal), 5.B-bromoallyl-5-sec-butyl-2,4,6-trioxy-pyrimidine (Pernocton).

Among the barbituates, the preferred members are amobarbital (amytal), phenobarbital (luminal), and barbital (veronal), and their sodium salts.

For amobarbital, phenobarbital and barbital, structural formulas are set forth below:

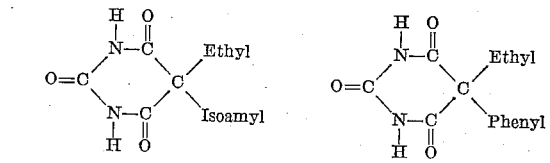

Amobarbital        Phenobarbital

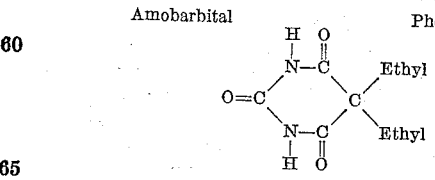

Barbital

Amobarbital may be prepared by the reaction of the diethyl ester of ethyl-isoamyl malonic acid and urea in the presence of sodium ethylate. Likewise, as indicated earlier, other desired barbiturates may be prepared by proper substitution of the malonic ester.

Varying proportions of barbiturate to pyrazolidine may be employed. For example, we have prepared a product suitable for injection by using 25 to 50 milligrams of sodium amobarbital for every 200 mg. of sodium butapyrazolidine.

The composition may be prepared in several ways. For example, the butapyrazolidine and barbiturate may be dissolved in sodium hydroxide and the liquid solution neutralized to pH 8.2 to 8.4.

If desired, a local anesthetic, such as procaine or xylocaine, may be added, though experience shows the anesthetic to be unnecessary in the product of this invention in order to relieve the pain and other side-effects of pyrazolidine. Its advantage lies in the therapeutic activity of the anesthetic, if any.

A further important feature of this invention is that due to the fact that inflammation does not accompany injection of the product of this invention, rapid absorption into the blood is indicated, thus enabling a high level of the therapeutic agent in the blood.

Hereinafter set forth are several case histories clearly demonstrating the efficacy and usefulness of the novel compositions of this invention.

Case A

Patient reported pain above left lower half of leg. On the leg there was a 10 cm. long pencil-like infiltration with an inflammatory indurated lesion adjacent thereto. This condition was diagnosed as Acute Thrombophlebitis. Patient received intramuscular injection of 0.6 gm. of sodium butapyrazolidine and 0.15 gm. of sodium amobarbital dissolved to yield a solution of 6 ml. Relief was immediate and patient was able to walk without pain.

Case B

Patient diagnosed as having Chronic Thrombophlebitis with an indurated inflammatory area of 15 cm. from ankle on up the inner part of the leg. After exhausting other methods of treatment without success, patient received an intramuscular injection of sodium butapyrazolidine and sodium amobarbital at the same dosage level as in Case A. Within 24 hours there was a substantial reduction of symptoms and relief of pain.

Case C

Patient diagnosed as having Acute Synovitis of left hip. No relief after treatment with hydrocortisone. Patient received an intramuscular injection of sodium butapyrazolidine and sodium amobarbital as in Case A. Relief of pain was noted in 15 minutes. Patient was prescribed daily oral dosages of butapyrazolidine for two days. No return of symptoms were noted.

Case D

Ten subjects were given a 1 ml. intramuscular injection of a 20% sodium butapyrazolidine solution in the left buttock and an injection of a 2 ml. solution containing 0.2 gm. of sodium butapyrazolidine and 0.05 gm. of sodium amobarbital in the right buttock. Extreme pain at the site of injection in left buttock was reported, whereas no pain other than usual pain accompanying injection was reported in the case where the novel composition of this invention was used.

Case E

Eight subjects were given two sub-cutaneous injections, one containing 0.5 ml. of a 20% butapyrazolidine solution and the other 3 ml. of solution containing 0.3 mg. of sodium butapyrazolidine and 0.075 gm. of sodium amobarbital. No pain or other bad side-effects reported in the case of administering the pyrazolidine compound alone. Furthermore, ulceration at the site of injection occurred in 3 out of 8 cases where the pyrazolidine was given alone.

Case F

Patient having Rheumatoid Arthritis received butapyrazolidine over a short period of time. A decrease of white blood cell count to 1200 was noted. After blood count returned to normal, patient was given intramuscular injection of sodium butapyrazolidine and sodium amobarbital at the dosage level of Case E for three successive days. No decrease in white blood cell count was noted in daily counts for two weeks thereafter.

We claim:

1. A product comprising the admixture of a member selected from the group consisting of compounds of the formula:

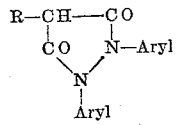

wherein R represents a hydrocarbon radical containing from 2–10 carbon atoms and linked to the pyrazolidine nucleus by by a non-quaternary carbon atom, and aryl represents a phenyl radical substituted by a member selected from the group consisting of H, chlorine, a lower alkyl and a lower alkoxy group and salts thereof with bases, and a compound selected from the barbituric acid group and their non-toxic salts.

2. A product comprising the admixture of a member selected from the group consisting of 1:2-diphenyl-4-n,-butyl-3:5-dioxopyrazolidine and salts thereof with bases and a compound selected from the group consisting of the barbituric acid group and their non-toxic salts.

3. A product as described in claim 2, wherein the member of the barbituric acid group is amobarbital.

4. A product as described in claim 2, wherein the member of the barbituric acid group is sodium amobarbital.

5. A product as described in claim 2, wherein the member of the barbituric acid group is sodium phenobarbital.

6. A product as described in claim 2, wherein the member of the barbituric acid group is sodium barbital.

7. An anti-inflammatory and analgesic product comprising a water-soluble salt of a compound of the formula:

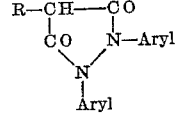

wherein R represents a hydrocarbon radical containing 2–10 carbon atoms and linked to the pyrazolidine nucleus by a non-quaternary carbon atom, and Aryl represents a phenyl radical substituted by a member selected from the group consisting of H, chlorine, a lower alkyl, and a lower alkoxy group, a compound selected from the group consisting of the water-soluble, non-toxic salts of barbituric acid and water to form an aqueous solution.

8. An anti-inflammatory and analgesic product comprising the admixture of an alkali salt of 1:2 diphenyl-4-n,butyl-3:5-dioxo-pyrazolidine, an alkali salt of amobarbital, and water to form an aqueous solution.

References Cited in the file of this patent

J.A.M.A., Aug. 23, 1958, p. 2116.
Goodman et al.: Pharmacol. Basis of Therap., 2nd ed. (1955), Macmillan Co., N.Y., pp. 141, 318, and 322.
U.S. Disp., 25th ed., 1955, Lippincott, Phila., pp. 1802–1804.